UNITED STATES PATENT OFFICE.

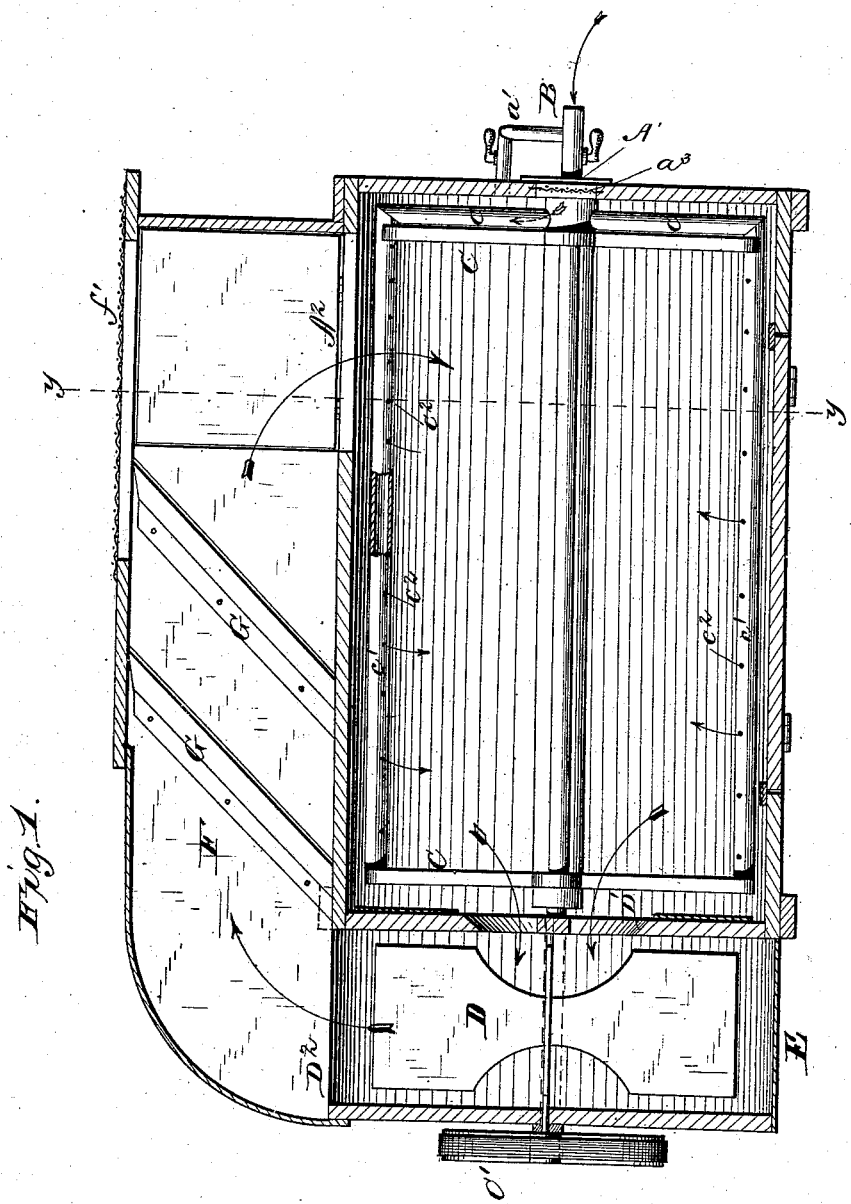

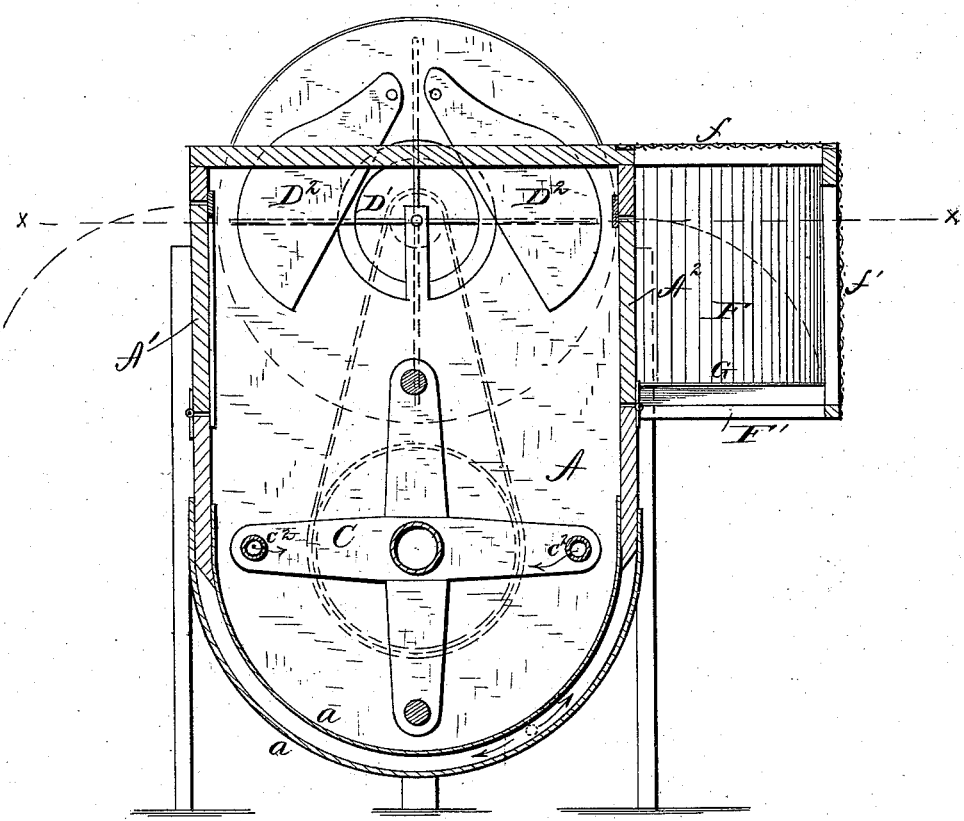
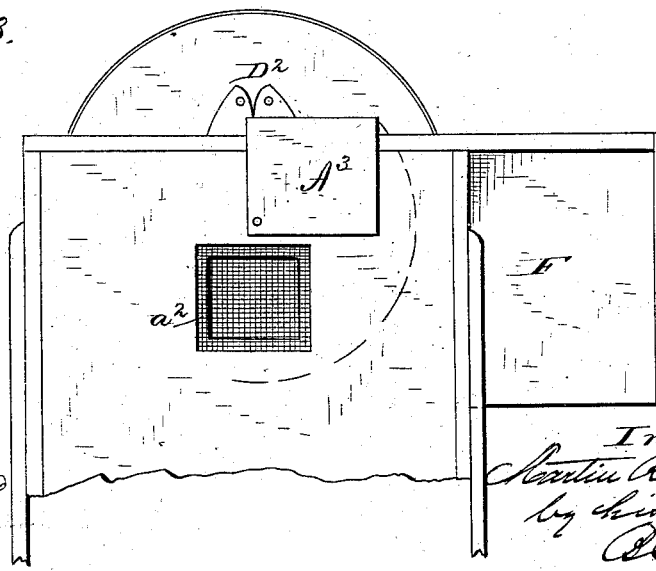

MARTIN R. RUBLE, OF NEWARK, NEW JERSEY.

ART OF RENOVATING FEATHERS.

SPECIFICATION forming part of Letters Patent No. 224,847, dated February 24, 1880.

Application filed December 26, 1879.

*To all whom it may concern:*

Be it known that I, MARTIN R. RUBLE, residing at Newark, in the county of Essex and State of New Jersey, have invented certain new and useful Improvements in the Art of Renovating Feathers, and apparatus for practicing said improvement in the art; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The renovation of feathers, as heretofore most extensively practiced, consisted in first thoroughly steaming the feathers and then drying the steamed feathers by artificial heat. This method has been found to be defective, not only because the feathers cannot be thoroughly purified by it, but also because said treatment left the feathers in a brittle and lifeless condition, so that they became worthless in a comparatively short period of time.

My improvement in the art is designed to renovate feathers in such a manner that they will become tough and enlivened by the purification.

To this end it consists in sweating the feathers and blowing them to drive off impurities, and to subsequently dry them by blowing; and the best mode now known to me of practicing this process consists in first sweating the feathers by wet steam in a sweating-box, and circulating the sweating feathers, mingled with common air, through a perforated conduit or trunk by a fan-blower, to drive off the impurities, after which the sweating is stopped, but the circulation and blowing of the feathers continued, to dry them.

The second part of my invention, which relates to an apparatus for practicing the above-described process, consists of certain combinations set forth in claims at the close of this specification, and made up out of certain mechanical devices of which the following are the principal: a sweating-box for sweating the feathers; a fan-blower for circulating the feathers and blowing them; a trunk, in part perforated, to conduct the feathers from the fan at one end of the sweating-box to the other end of said sweating-box; a reel in the sweating-box for agitating the feathers therein; a pipe for supplying wet steam or vapor of water.

In order that my invention may be clearly understood, I will proceed to describe the process in connection with the apparatus illustrated in the annexed drawings, which is the best apparatus now known to me for that purpose, although I do not limit myself to the use of this particular apparatus for practicing my said process, as that might be successfully practiced by apparatus of different construction.

Figure 1 is a horizontal section of the apparatus in the plane indicated by line $x\ x$ of Fig. 2. Fig. 2 is a transverse section thereof in the plane indicated by line $y\ y$ of Fig. 1. Fig. 3 is an end elevation.

The same letters of reference are used in all the figures in the designation of identical parts.

The sweating-box A has a bottom concave in cross-section. The bottom is preferably constructed of two parallel curved plates, $a\ a$, of sheet metal, with an intervening space, into which steam may be introduced through a branch, $a'$, from the main steam-pipe B, in order to dry the box preparatory to the introduction of the feathers. The sweating-box is provided with a door, A', through which the feathers are to be passed into it. A reel, C, is mounted in the lower part of the sweating-box, and is used to agitate the feathers, as well as to charge them with the vapor of water or wet steam employed for sweating them. To these ends the reel-shaft extends through the box at one end, to receive a pulley, C', by which to rotate it, and is made hollow at its other end, to receive steam from the steam-pipe B. From the hollow end of the reel-shaft branch pipes $c\ c$ extend to and connect with hollow arms or beaters $c'\ c'$ of the reel, to supply said hollow arms or beaters with steam, and these hollow beaters have numerous perforations, $c^2$, to allow jets of vapor or steam to escape into the mass of feathers in the sweating-box.

At the end opposite to that where the vapor or steam enters the sweating-box is provided with a fan-blower, D, mounted in the chest E. The inlet D' of the fan-blower opening into the sweating-box is preferably placed at a point near the top of said box, so as to be above the main bulk of feathers when the box is charged. This inlet of the fan-blower is controlled by a valve, $D^2$, (made in this instance of two wings,) reaching to the outside of the sweating-box for convenience of operation.

The outlet $D^3$ of the fan-blower opens into a trunk, F, which extends along the side of the sweating-box to the other end thereof. At the end remote from the fan-blower large openings are present in the top, outer side, and bottom of the trunk F. The openings in the top and outer side are covered by screens $f$ and $f'$, respectively, composed of perforated plates or wire-cloth.

The opening $F'$ in the bottom of the trunk has no covering, but may be closed by a gate, $A^2$, which is the means of closing either this opening $F'$ or a similar opening in the side of the sweating-box and communicating with the trunk. Thus gate $A^2$ controls the two exits from the end of trunk F remote from the fan-blower.

Inclined plates G G are secured to the solid portion of the bottom of the trunk, to give upward direction to the currents, so as to form eddies under the plates for the deposition by precipitation of foreign substances.

The end of the sweating-box remote from the fan-blower is also provided with an opening covered with a screen of wire-cloth, $a^2$, and controlled by a valve, $A^3$.

The fan-blower may be driven in any suitable manner, either from the reel-shaft or from a separate shaft.

My improved process of renovating feathers, as practiced with the aid of the apparatus described, is as follows: Steam is turned into the hollow bottom of the sweating-box in order to thoroughly dry the apparatus. Enough feathers are then put in the sweating-box to fill it about one-third full. The reel is then started to beat and separate the dry feathers, and shortly afterward wet steam is turned on and charged into the mass of feathers, which continue to be agitated by the reel. The steam used should be wet steam, only sufficiently hot to sweat the feathers and dissolve gummy substances attached to them. After the feathers have been thus thoroughly sweated, the fan-inlet $D'$ is uncovered, the gate $A^2$ turned down, and the fan-blower started. The blower at once begins to circulate the feathers (which continue to be sweated) from the sweating-box through the trunk and back again to the sweating-box. The blower also draws in air through the screens $f$ and $f'$, and discharges air laden with odors and impurities from the feathers through the same screens. This combined sweating and blowing of the feathers is continued until the air escaping through the screens $f$ and $f'$ begins to be free from odor. At that juncture the steam is turned off so as to stop the further sweating of the feathers; but the circulation and blowing of the feathers by the fan is continued until the feathers become thoroughly dry.

The reel-beaters, fan-blades, and sides of the trunk act all the time while the feathers are being circulated by the fan-blower as rubbing-surfaces, and aid in cleaning the feathers, in livening them up, and in making them flexible and tough.

The renovation of the feathers being completed, they may be discharged from the apparatus through opening $F'$ in trunk F by the action of the fan-blower. To that end gate $A^2$ must be turned up and valve $A^3$ must be turned to uncover screen $a^2$ for the admission of air to the box A. By placing a sack or bed-tick under opening $F'$ the feathers may be discharged into it.

It is best to subject the feathers to a preliminary beating and sweating, as hereinbefore described; but these steps are not essential steps of my process.

It will be understood that the reel continually lifts the feathers and loosens up the mass, and thus aids materially in the process by facilitating the thorough sweating and blowing of the feathers.

What I claim as my invention, and desire to secure by Letters Patent, is—

1. As an improvement in the art of renovating feathers, the process, substantially as before set forth, consisting of the following steps, namely: first, simultaneously sweating and blowing the feathers to drive off impurities; second, blowing the feathers to dry them.

2. In the process of renovating feathers, simultaneously circulating and blowing the feathers by the air draft and blast of a fan-blower, substantially as before specified.

3. The combination, substantially as before set forth, of the sweating-box, the fan-blower, and the perforated trunk.

4. The combination, substantially as before set forth, of the sweating-box, the fan-blower, the perforated trunk, and the gate for controlling the two exits from the end of the trunk remote from the fan.

5. The combination, substantially as before set forth, of the sweating-box, the reel, the fan-blower, and the perforated trunk.

6. The combination, substantially as before set forth, of the sweating-box, having an opening at one end, through which air may be admitted, the fan-blower at the other end, and the trunk, having an opening in the end remote from the fan for the discharge of the feathers by the action of the fan.

7. The combination, substantially as before set forth, of the sweating-box, the fan-blower, and the trunk constructed with eddy-plates.

In testimony whereof I affix my signature in presence of two witnesses.

MARTIN R. RUBLE.

Witnesses:
CHAS. A. NEALE,
H. J. ENNIS.